(12) United States Patent
White et al.

(10) Patent No.: US 6,409,980 B1
(45) Date of Patent: Jun. 25, 2002

(54) PROCESS AND APPARATUS FOR TREATING FOUNDRY SLUDGE TO RECOVER MAGNESIUM

(75) Inventors: Carl W. White, Danville; Jean Guimont, Québec; Denys Pinard, Asbestos; Serge Monette, Longueuil, all of (CA)

(73) Assignee: Noranda, Inc., Tornton (CA)

( * ) Notice: Subject to any disclaimer, the term of this patent is extended or adjusted under 35 U.S.C. 154(b) by 0 days.

(21) Appl. No.: 09/594,490

(22) Filed: Jun. 16, 2000

(51) Int. Cl.[7] .................... C01F 5/00; C22B 26/00
(52) U.S. Cl. .............. 423/155; 423/158; 423/160; 423/197; 423/497
(58) Field of Search .................. 423/155, 158, 423/160, 197, 497

(56) References Cited

U.S. PATENT DOCUMENTS 3,484,195 A * 12/1969 Lewis et al.
3,516,785 A * 6/1970 Smith
3,886,259 A * 5/1975 Nikolai, Jr. et al.
4,100,254 A * 7/1978 Grohmann et al.
4,341,752 A * 7/1982 Groenhof

* cited by examiner

Primary Examiner—Steven Bos
(74) Attorney, Agent, or Firm—Katten Muchin Zavis Rosenman

(57) ABSTRACT

Process and apparatus for recovering magnesium from foundry sludge and cell bleed electrolytes includes structure and/or steps for: (i) dissolving, in a water slurry, soluble chloride compounds in the magnesium-containing material; (ii) acidifying the water slurry to between substantially pH 4 and substantially pH 6; (iii) further acidifying the water slurry to between substantially pH 1 and substantially pH 0, and providing a magnesium chloride solution; (iv) precipitating calcium from the magnesium chloride solution; (v) separating solids from the magnesium chloride solution; (vi) stripping $SO_2$ from the magnesium chloride solution; and (vii) precipitating NaCl from the magnesium chloride solution to provide a concentrated magnesium chloride solution.

39 Claims, 2 Drawing Sheets

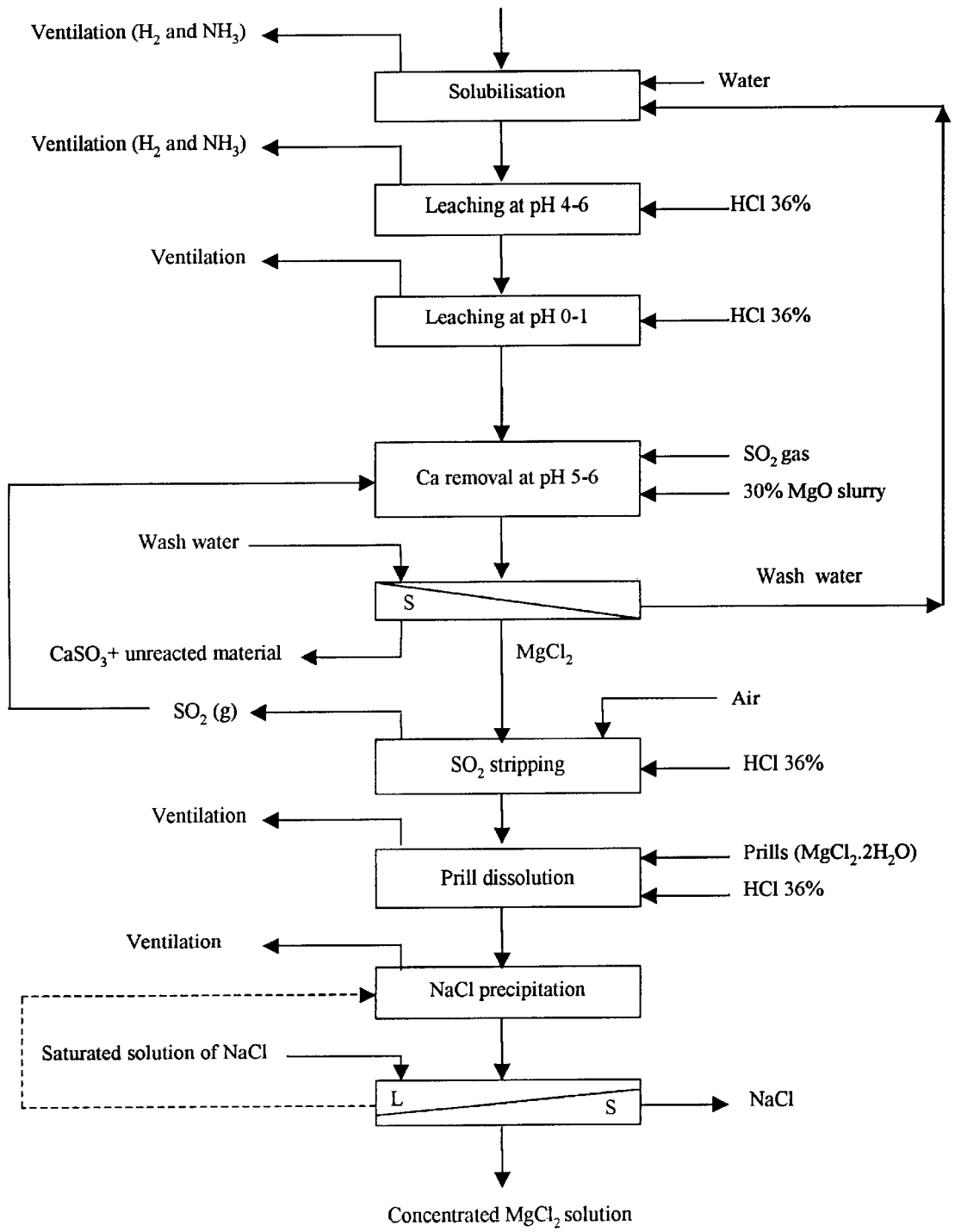
Figure 1: Treatment of foundry sludge

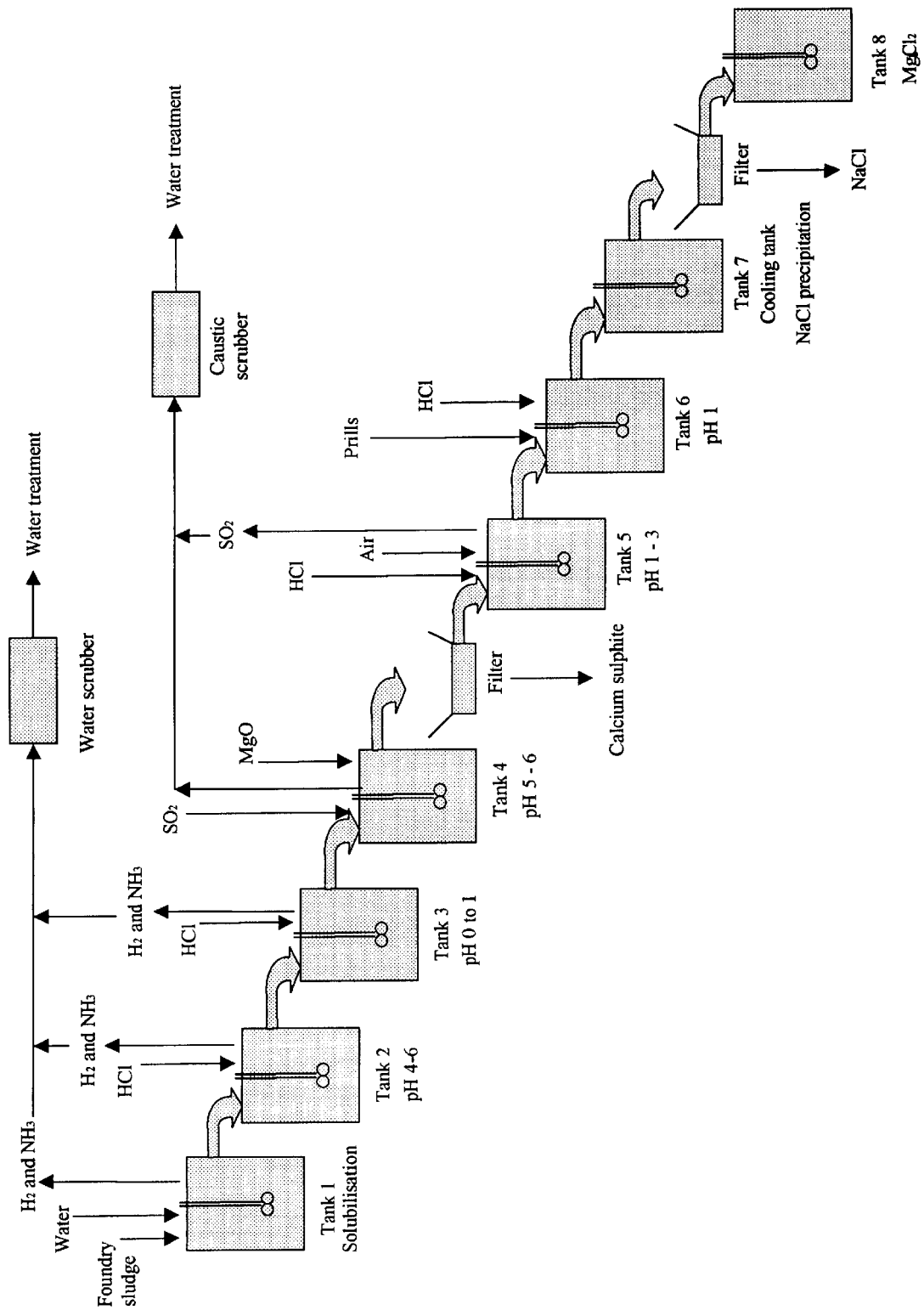
Figure 2: Diagram of apparatus for the treatment of foundry sludge

US 6,409,980 B1

PROCESS AND APPARATUS FOR TREATING FOUNDRY SLUDGE TO RECOVER MAGNESIUM

BACKGROUND OF THE INVENTION

1. Field of the Invention

The present invention relates to a new hydrometallurgical process and apparatus for treating foundry sludge and cell bleed electrolyte to recover magnesium as magnesium chloride, while selectively removing calcium and sodium. The present invention also relates to removing calcium and sodium impurities from brines of magnesium chloride.

2. Related Art

In the production of pure magnesium metal, various sludge are generated from the foundry and the electrolytic cell. For example, pure magnesium metal may be cast in a casting furnace, and magnesium alloys may be cast in an alloying furnace. Both of these furnaces will produce residues called sludge which contain mainly magnesium metal, magnesium chloride, sodium chloride, calcium chloride, calcium oxide, and magnesium oxide. This electrolytic cell also produces cell bleed electrolyte containing magnesium metal and various other compounds.

The disposal of these sludge (containing magnesium metal with chlorides and oxide compounds) presents a problem. If stockpiled, this material constitutes a safety hazard since it is reactive and readily emits hydrogen and ammonia gas. The current practice for magnesium producers is to store this material in sealed containers or to landfill the material. This creates a severe environmental issue.

Known methods exist for producing magnesium chloride from mixtures of magnesium and calcium chloride or to separate calcium and sodium from magnesium chloride solution. For example, U.S. Pat. No. 3,516,785 (incorporated herein by reference) describes a process for the recovery of magnesium chloride from sodium, potassium, magnesium chloride and sulphate containing mixed salt solutions, by successive concentrations to precipitate first sodium, and then potassium-magnesium double salts, and disulphate the mother liquor with calcium chloride. More specifically, in the first step, the solution is subjected to solar evaporation to precipitate sodium chloride followed by kainite ($KCl.MgSO_4.3H_2O$) with additional NaCl in the second step. The liquor is then desulphated by the use of calcium chloride to precipitate calcium sulphate. However, this patent is more particularly concerned with the selective recovery of magnesium chloride from naturally occurring brines such as found in the oceans and salt lakes.

U.S. Pat. No. 4,100,254 (incorporated herein by reference) describes an industrial process for preparing high-purity magnesia from impure magnesium-containing starting material, wherein the starting material is dissolved in HCl and the resultant acidic solution is subjected to a multi-step treatment for precipitating impurities out of the solution. In this process, sulphate ions are added, for instance, in the form of magnesium sulphate or sulphuric acid to the concentrated solution to convert the calcium ions dissolved in the solution into calcium sulphate which is precipitated and filtered from the solution. However, calcium sulphate has a relatively high solubility, and it cannot air stripped to a very low level.

U.S. Pat. No. 4,341,752 (incorporated herein by reference) describes a method for producing purified and concentrated $MgCl_2$ brine by evaporation and crystallization from brines containing $MgCl_2$, KCl, NaCl and $MgSO_4$, involving recirculation of carnallite and part of the final product brine. The method results in a pure end product by a simple process comprising only one evaporation step and without any addition of chemicals. In both examples presented in this patent, the brine composition assayed 450–455 g/l $MgCl_2$, 14–15 g/L $MgSO_4$, 5–6 g/l NaCl and 2 g/l KCl after evaporation and at 30° C. There are two major disadvantages with this method:

The presence of $MgSO_4$ in the brine is unacceptable, particularly for the electrolytic cells, and This method also does not remove calcium from the brine. If the cell electrolyte is bled to control the calcium in the circuit, it must be removed.

Thus, what is needed is a new technology that has the potential of treating all of the sludge, therefore minimizing the magnesium and chloride losses while selectively removing calcium and sodium to produce a relatively concentrated magnesium chloride solution.

SUMMARY OF THE INVENTION

The present invention represents a new hydrometallurgical process and apparatus for recovering magnesium as magnesium chloride solution from various foundry sludge and cell bleed electrolyte while removing calcium and sodium.

According to one aspect of the present invention, recovering magnesium from a magnesium-containing solution includes structure and/or steps for: (i) dissolving, in a water slurry, soluble chloride compounds in the magnesium-containing solution; (ii) acidifying the water slurry to between substantially pH 4 and substantially pH 6; (iii) further acidifying the water slurry to between substantially pH 1 and substantially pH 0, and providing a magnesium chloride solution; (iv) precipitating calcium from the magnesium chloride solution, (v) separating solids from the magnesium chloride solution; (vi) stripping $SO_2$ from the magnesium chloride solution, and (vii) precipitating NaCl from the magnesium chloride solution to provide a concentrated magnesium solution. Note that the process can begin at step (iv) if the magnesium chloride solution is provided.

According to another aspect of the present invention, a method for recovering magnesium chloride from a magnesium-containing sludge, includes the steps of: (i) reducing the sludge preferably to between −10 to −48 mesh; (ii) slurrying the reduced sludge in water to dissolve soluble chloride compounds in the sludge; (iii) acidifying the sludge slurry to between substantially pH 4 and substantially pH 0 by the addition of HCl acid, keeping the slurry potential above substantially −850 mV; (iv) further acidifying the sludge slurry to between substantially pH 1 and substantially pH 6 by the addition of HCl acid until the slurry potential reaches a positive value, and providing a leach slurry; (v) neutralizing the leach slurry to pH 5–6 by the addition of MgO; (vi) sparging the neutralized leach slurry with sulphur dioxide gas to precipitate calcium from the leach slurry; (vii) separating solids from the leach slurry to recover a magnesium chloride solution; (viii) stripping $SO_2$ from the magnesium chloride solution by adding HCl to adjust the pH preferably between pH 0 to pH 3, and sparging with air; (ix) increasing the total chloride concentration of the magnesium chloride solution by one of (a) prills dissolution and (b) HCl sparging, to precipitate NaCl; and (x) separating the precipitated NaCl from the magnesium chloride solution to provide a concentrated magnesium solution.

BRIEF DESCRIPTION OF THE DRAWINGS

FIG. 1 illustrates a flow chart of the process according to the present invention.

FIG. 2 is a schematic block diagram showing apparatus according to the present invention.

DETAILED DESCRIPTION OF THE PRESENTLY PREFERRED EXEMPLARY EMBODIMENTS

It is expected that three different types of sludge may be treated by the process according to the present invention: foundry furnace sludge; alloying furnace sludge; and cell house bleed electrolyte. Note, however, that other magnesium-containing solutions and sludge may be used in the present invention. Various combinations of such sludge will be collected and cast into ingots for safe handling and temporary storage. These ingots will contain some magnesium metal, expected to vary from 3 to 40%. As a pretreatment, the ingots will be disaggregated by the use of either a mechanical or an hydromechanical process and screened to recover about 70–80% of the magnesium metal in the coarse fraction, expected to be within +10 to +48 mesh. The fine fraction, being between –10 to –48 mesh, will be recovered as the feed to the new sludge treatment process to be described below.

While more detailed examples follow, in general terms, the new process and apparatus for treating sludge comprises the following steps (referring to FIGS. 1 and 2):

Initially, the sludge is reduced to –10 to –48 mesh through a physical treatment such as grinding (using known grinding machines), followed by screening to produce the required mesh.

In step #1, the reduced sludge is slurried into water in a first reactor tank 1 to dissolve substantially all soluble chloride compounds such as $MgCl_2$, $CaCl_2$, NaCl and KCl or any other chloride compounds present in the sludge. For example, the target slurry is 30% solids by weight, and 70% water when a large amount of MgO is expected. The initial % solid is based on the composition of feed material to obtain about 350 to 400 g/l $MgCl_2$ after the last stage (NaCl removal). The % solid really depends on the feed material. For example, if the feed is mainly chloride salt such as the cell bleed electrolyte, it may be possible to operate at higher % solids than 30%.

The sludge should be added slowly to control the reaction of residual magnesium metal with water, therefore minimizing the evolution of hydrogen and ammonia gas. For example, if the retention time of the first tank (which is the water treatment tank) is 90 minutes, the sludge will be added continuously over 90 minutes. This assumes that the feed or the sludge will contain no more than 3% Mg metal which reacts with water to form $Mg(OH)_2$ and hydrogen gas. The addition of the sludge can be controlled according to the measured slurry potential, for example, measured with ORP (Oxidation-Reduction Potential) probes. If the potential is positive, it is an oxidizing solution but if the potential is negative, it is a reducing solution. In the present process, because magnesium metal reacts with water to form hydrogen gas, the potential of the slurry is usually negative until there is no more magnesium metal which occurs at the end of the pH 1 leaching stage.

The controlled addition of the sludge can therefore minimize the hydrogen and ammonia evolution. The off-gas may be collected into a water scrubber 14. This step can handle feed material containing up to 20% by weight magnesium metal. The reaction in water can be effected at temperatures varying from 25° to 105° C., e.g. the boiling point (preferably 35° to 99° C., more preferably 45° to 93° C., even more preferably 55° to 87° C., more preferably 65° to 81° C., and most preferably 75° C.) with an adequate cooling system.

In step #2 of the process, the water leach slurry is acidified to pH 4 to 6 with the addition of concentrated hydrochloric acid in tank 2 (which may be the same tank) generating a slurry potential varying from 0 to –850 mV (Ag—AgCl reference electrode with 3 M KCl electrolyte) to partially dissolve the oxide metals such as MgO, CaO, $Fe_2O_3$, $Al_2O_3$, MnO and some of the magnesium metal. For example, the hydrochloric acid concentration can vary from 34% to 37% by weight (standard commercial hydrochloric acid), although 36% HCl is preferred. The acid consumption depends of two factors:

The amount of oxide present in the feed (MgO, CaO), and

The amount of magnesium metal.

The HCl concentration will depend on the feed composition. In the examples to be described below, the consumption in step #2 at pH 4 to 6 varied from 0.4 g to 0.9 g of 36% HCl kg of feed. Thus, the acid requirement will depend of the feed composition. Also, lower acid concentration such as 32% or lower can be used.

The slurry potential is controlled to be from 0 to –850 mV, depending on the feed composition. When the potential is negative, it means that hydrogen and ammonia gasses are being generated. In laboratory experimentation, the lowest potential was –850 mV which generated 1.2% $H_2$ in the off-gas. As is known, at 4% in the off-gas, hydrogen becomes explosive. Thus, if the process is operated without going lower than –1000 mV (1 volt), measured with a silver-silver chloride reference electrode, the process will be absolutely safe even if there are some occasional surges of hydrogen. If a continuous leach circuit is desired , an off-gas burner may be installed, which will burn the hydrogen gas before it becomes explosive. Although –850 mV (Ag—AgCl) is safe, it is reasonable to assume that the process can run as low as –1000 mV with (Ag—AgCl). Indicating the type of reference electrode such as silver-silver chloride with 3 M potassium chloride electrolyte is desirable.

Other impurities such as Silica ($SiO_2$), nickel, chromium, sulphur, fluorine, potassium, boron, even sulphates may also be extracted in this step. The acid addition can be added on demand to keep the slurry potential above –750 mV. A slurry potential varying from –700 mV to –850 mV was recorded during a laboratory investigation generating hydrogen evolution of about 1.2% in the off-gas. The reaction is highly exothermic and it can be effected at temperatures ranging from 50° to 105° C., e.g. the boiling point (preferably 35° to 99° C., more preferably 45° to 93° C., even more preferably 55° to 87° C., more preferably 65° to 81° C., and most preferably 75° C.) with an adequate cooling system.

In step #3 of the process, the slurry is acidified to pH 0 to 1 with the addition of concentrated hydrochloric acid in tank 3 (which may be the same tank). Again, the hydrochloric acid concentration can vary from 34% to 37% by weight (standard commercial hydrochloric acid), although 36% HCl is preferred. The acid consumption depends of two factors:

The amount of residual oxide not extracted in step #2, at pH 4 to 6, and

The amount of residual magnesium metal (mainly coarse particle requiring a lower pH or higher acidity).

Again, The HCl concentration will depend on the feed composition. As noted above, if there is no oxide and no metal, only chloride salts, the value will be zero. In the examples to be described below, the acid consumption in step #3 at pH 0 to 1 varied from 0.4 g to 0.6 g of HCl 36% per kg of feed. One may expect to have a lower acid consumption in step #3 compared to step #2.

The slurry potential is first characterized by a constant increase while the pH drops from pH 4 to 6 to pH 0 to 1 and by a rapid increase from a negative value (for example, −100 to −200 mV) to a positive value (for example, +300 to +450 mV) at the end of the reaction. The rapid increase of the potential is indicative of the completion of the reaction. Hydrogen and ammonia evolution can be detected in the off-gas when the slurry potential is negative. The reaction is highly exothermic and it can be effected at temperatures ranging from 50° to 105° C., e.g. the boiling point (preferably 35° to 99° C., more preferably 45° to 93° C., even more preferably 55° to 87° C., more preferably 65° to 81° C., and most preferably 75° C.) with an adequate cooling system.

The leach slurry often contains a small amount of unleached material that can be either recovered by filtration for disposal or can be left into the solution for the next step. For example, after the leach at pH 0 to 1, there may be some material that cannot be dissolved at that pH. Such material may include complex oxide material and typically represents less that 3% by weight in the final slurry. Per ton of sludge treated, 0.03 ton of unleached material may be produced, certainly less than 10% by weight.

In step #4, calcium is precipitated from the magnesium chloride solution in tank 4 (which may be the same tank). The leach liquor at pH 0 to 1 is first neutralized to pH 5–6 with the addition of MgO in the same tank. For example, the examples to be described below used a 30% MgO slurry (by weight); 300 g of MgO+700 g water. MgO consumption varied from 186 g to 263 g of 30% MgO slurry per kg of feed. The examples used 30% MgO slurry to minimize the input of water diluting the magnesium chloride solution. Above 30%, it could become difficult to feed the MgO slurry (too thick). Feeding dry MgO is not a current practice in hydrometallurgy, although it may be used depending on the feed composition.

After pH neutralization, sulphur dioxide gas is sparged in excess of the stoichiometric requirement to precipitate calcium as calcium sulphite. Of course, any other reagents supplying sulphite ions in solution (such as soluble sulphite and bisulphite salts and others) can be used to replace $SO_2$ gas. Calcium can also be precipitated with the use of oxalic acid or its derivatives to produce insoluble calcium oxalate. However, the economics of oxalic acid is less attractive than $SO_2$. The acid liberated by the precipitation of calcium sulphite is neutralized with MgO to maintain pH 5 to 6. The reaction can be effected successfully at temperatures ranging from 50° to 105° C. (preferably 35° to 99° C., more preferably 45° to 93° C., even more preferably 55° to 87° C., more preferably 65° to 81° C., and most preferably 75° C.). Over 99% calcium removal can be achieved regardless of the $MgCl_2$ concentration. Residual dissolved sulphur dioxide can vary from 1 to 10 g/L. In contrast to the above-described U.S. Pat. No. 4,100,254, in the present invention, calcium is precipitated as calcium sulphite which as a much lower solubility than calcium sulphate. Furthermore, the removal of any excess sulphite can be accomplished by air stripping to very low level, which is not the case for excess sulphate.

In step #5, following the calcium precipitation, the slurry is subjected to solid/liquid separation to recover the magnesium chloride solution and a residue containing calcium sulphite and unreacted material. For example, the calcium sulphite precipitate may be recovered by filtration in filter 18, under vacuum. In the lab, a Buchner funnel fitted with a filter cloth was used. For the commercial production, either a pan filter or a very small belt-filter may be used. The solid is recovered for disposal and the liquid is collected into another tank for step #6. Although the experiments to be described below were carried out with batch tests, the commercial operation will be a continuous process.

The separated solid residue is then discarded in a safe manner. The remaining magnesium chloride solution contains $MgCl_2$, NaCl, small amounts of KCl, and traces of Mn, Fe and Al. It also contains 1 to 10 g/l of dissolved $SO_2$ that is removed in the subsequent stripping step.

In step #6, the magnesium chloride solution in tank 5 (which may be the same tank), is subjected to $SO_2$ stripping by adjusting the solution pH to pH 1 to pH 3 by the addition of 36% HCl and by sparging air at a ratio of 0.25 to 1.5 litre of air per liter of solution. In more detail, the magnesium chloride solution recovered by filtration in step #5 still contains residual dissolved $SO_2$ as sulphurous acid ($H_2SO_3$). In step #6, the pH is lowered from pH 5 to 6 to pH 0 to 3 with 36% hydrochloric acid, which converts the sulphurous acid ($H_2SO_3$) to $SO_2$ gas while sparging air to evacuate the $SO_2$ gas that will be recovered into a scrubber 16. Both operations are carried out in the same tank. It should be noted that it is possible to strip the $SO_2$ and to re-use the gas in another step.

The stripping is effected at 50° to 100° C. (preferably 60 to 90° C., more preferably 70° to 80° C., most preferably 75° C.). The residual $SO_2$ can be dropped from about 1–10 g/l to <10 mg/l in about 30 to 90 minutes depending of the air-to-solution ratio and the solution temperature. Note that the off-gas containing the air-$SO_2$ mixture should be treated in a caustic scrubber to produce a sulphite solution that can be re-used in the process or returned directly as gas to step #4. The presence of any residual sulphur species in the magnesium chloride solution can be detrimental to the electrolytic process for producing magnesium metal.

In step #7, the total chloride concentration is increased through the dissolution of magnesium chloride such as prills ($MgCl_2.2H_2O$) or by sparging HCl gas in tank 6 (which may be the same tank). With the addition of prills, the objective is to increase the $MgCl_2$ concentration to about 350 to 400 g/l in solution. The solution pH increases to pH 4 to 6 due the presence of MgO in the prills. Hydrochloric acid is added to lower the pH to pH 1, therefore dissolving the MgO. Note that HCl gas is also quite effective in increasing the total chloride concentration of the solution therefore lowering the NaCl concentration. Levels as low as 2 g/l NaCl can be achieved with the use of HCl gas. However, HCl gas generates a very acidic solution that potentially creates corrosion problems and it is much more difficult to handle. The use of prills, when available and if required, is believed to be environmentally safer.

In step #8, the solution is cooled to 25° C. in tank 7 (which may be the same tank) to precipitate NaCl crystals that are recovered in step #9 by filtration in filter 20, generating a concentrated magnesium chloride solution containing low calcium and <15 g/l NaCl. For example, vacuum filtration (similar to the filtration of calcium sulphite) may be used.

The final solution is provided to tank 8 (which may be the same tank) where it can be subjected to further purification treatment. For example, the foundry slugde treatment process is designed to remove calcium and sodium from magnesium chloride solution. However, the solution still contains traces of impurities that should be removed prior to the electrolytic process. In the present application, the solution may be fed to a further leach process comprising of several neutralisation steps to remove all impurities. Other options are also available such as ion exchange, solvent extraction, etc.

The examples given below were collected from laboratory evaluation.

EXAMPLE #1

In the first step, 1.5 kg of −10 mesh of dry sludge assaying 20–30% $CaCl_2$, 12–15% NaCl, 5–10% $MgCl_2$, <1% KCl, 15–20% MgO, 0.5–2% $Fe_2O_3$, $Al_2O_3$, MnO, CaO, 5% Mg metal and 1–2% of others was slurried with 3.5 kg of water at 75° C. in less than one hour under good mixing in a first reactor. The reaction was exothermic and the slurry temperature was maintained to 75° C. with a cooling system. Hydrogen and ammonia gas were detected in the off-gas while mixing the sludge with water. Slurry potential never dropped below −800 mV. All chloride compounds dissolved in the first step.

In the second step, the slurry was heated up to 90° C. prior to adjusting the pH to pH 6 with the addition of concentrated hydrochloric acid (1.1 litre of 36% hydrochloric acid) over 60 minutes. The acid was added on demand by controlling the slurry potential to greater than −650 mV. The reaction being exothermic, the temperature was maintained to 90° C. with the used of a cooling system. The slurry potential remained above −650 mV. Hydrogen and ammonia gas were detected in the off-gas during the acid addition.

In the third step, the slurry pH was adjusted to pH 1 by adding additional concentrated hydrochloric acid (0.8 litre of 36% hydrochloric acid). As with the second step, the acid addition was added on demand by controlling the slurry potential to greater than −650 mV to minimize the hydrogen and ammonia evolution The slurry potential was characterized by a rapid increase from −100 mV to +370 mV at the completion of the reaction. Hydrogen and ammonia gas were detected in the off-gas when the slurry potential was negative. The slurry temperature was maintained to 90° C. with a known cooling system. Overall magnesium, calcium and sodium extractions ranged from 98.9% to 99.9% at pH 1 with 42–97% extractions of iron, aluminium and manganese. The leach liquor assayed 195–215 g/l $MgCl_2$, 75–85 g/l $CaCl_2$, 38–45 g/l NaCl and 1–3 g/l Mn, Fe, Al and K. The metal extractions were calculated by the amount of metal in solution over the total amount of metal in the feed. In this process, extractions over 98% to 99% for magnesium, calcium and sodium can be obtained.

In the fourth step, the slurry was neutralized to pH 6 with the addition of MgO slurry prior to sparging sulphur dioxide at 1.8 l/min to precipitate calcium as calcium sulphite. To adjust the pH to 6, 301 g of 30% MgO slurry was added over 30 minutes (batch process). The acid liberated by the precipitation of calcium sulphite was neutralized with MgO slurry to maintain pH 6. To maintain pH 6 during the calcium precipitation, 722 g of 30% MgO slurry was added over 60 minutes. After 60 minutes of sparging, 98.9% calcium precipitation was achieved with 224 mg/l Ca remaining in solution. Overall MgO and sulphur dioxide efficiencies were estimated at >65% and >80% respectively at the laboratory scale.

In the fifth step, the final slurry was then filtered (with a Buchner funnel under vacuum) at 90° C. to recover the magnesium chloride solution for further purification and the residue was washed for disposal. The final liquor assayed 275–280 g/l $MgCl_2$, 35–40 g/l NaCl, 0.6 g/l $CaCl_2$, and 0.6–0.9 g/l Mn and K. It also contained about 4 g/l residual dissolved sulphur dioxide as sulphite. The final residue assayed 5–10% Mg (mainly as inert material), 18–20% Ca (mainly as calcium sulphite) and traces of other elements.

In the sixth step, the magnesium chloride solution was subjected to $SO_2$ stripping by adjusting the solution pH to pH 1, and by sparging air at a ratio of 1.5 l of air per litre of solution. The stripping was done by blowing air under the mixer at 1.5 litre/minute per litre of solution while adjusting pH to pH 1 with 60 ml of 36% hydrochloric acid into 4.3 litres of solution. The stripping was effected at 50° C. due natural cooling of the solution. The residual $SO_2$ dropped from about 4 g/l to 9 mg/l in about 30 minutes. One should note that the off-gas containing the air-$SO_2$ mixture should be treated in a caustic scrubber to produce a sulphite solution to be re-used in the process. Additional stripping tests were carried with similar solutions by varying the air-to-solution ratio under the same conditions. By decreasing the air-to-solution ratio from 1.5 to 0.25, the time to achieve complete stripping increases from 30 minutes to 90 minutes at the laboratory scale.

In the seventh step, sodium chloride was precipitated by dissolving magnesium chloride. After the $SO_2$ stripping, the solution was heated up to 75° C. prior to adding prills of $MgCl_2.2 H_2O$ to increase the $MgCl_2$ concentration to about 350–400 g/l in solution. About 0.4 to 0.5 kg of prills ($MgCl_2.2H_2O$) per kg of feed was added over an hour to increase the total chloride concentration. About 0.15 to 0.25 liter of 36% HCl per kg of feed was then added to dissolve the MgO contained in the prills. The amount of prills required depends of the initial concentration of $MgCl_2$ and the target concentration of NaCl. It is possible to obtain 15–20 g/L NaCl by increasing the $MgCl_2$ to 350 g/L. The solution pH increased to pH <6 due the presence of MgO in the prills. Hydrochloric acid was added to lower the pH to pH 1, therefore dissolving the MgO. Then the solution was cooled to 25° C. to precipitate NaCl crystals. The final solution assayed 370 g/l $MgCl_2$ and 21 g/l NaCl. The NaCl was recovered by filtration, generating a magnesium chloride solution containing low calcium and low sodium that can be subjected to further purification treatment. Note that the solution can be fed back to the leach and neutralization steps.

EXAMPLE #2

In the first step, 1.5 kg of −10 mesh of dry sludge assaying 20–30% $CaCl_2$, 12–15% NaCl, 5–10% $MgCl_2$, <1% KCl, 15–20% MgO, 0.5–2% $Fe_2O_3$, $Al_2O_3$, MnO, CaO, 5% Mg metal and 1–2% of others was slurried with 3.5 kg of water at 75° C. in less than one hour under good mixing in a first reactor. The reaction was exothermic and the slurry temperature was maintained to 75° C. with a cooling system. Hydrogen and ammonia gas were detected in the off-gas while mixing the sludge with water. Slurry potential never dropped below −775 mV. All chloride compounds dissolved in the first step.

In the second step, the slurry was heated to 100°–105° C. prior to adjusting the pH to pH 6 with the addition of concentrated hydrochloric acid (1.09 liters of 36% hydrochloric acid) over 60 minutes. The acid was added on demand by controlling the slurry potential to greater than −650 mV. The reaction being exothermic, the temperature was maintained to 100°–105° C. with the used of a cooling system. The slurry potential remained above −644 mV. Hydrogen and ammonia gas were detected in the off-gas during the acid addition.

In the third step, the slurry pH was adjusted to pH 1 by adding additional concentrated hydrochloric acid (0.73 liter of 36% hydrochloric acid over 60 minutes). As for the second step, the acid addition was added on demand by controlling the slurry potential to greater than −650 mV to minimise the hydrogen and ammonia evolution. The slurry potential was characterized by a rapid increase from −130 mV to +350 mV at the completion of the reaction. Hydrogen and ammonia gas were detected in the off-gas when the slurry potential was negative. The slurry temperature was maintained to 100°–105° C. with a cooling system. Overall magnesium, calcium and sodium extractions ranged from 98.8% to 99.9% at pH 1 with 60–98% extractions of iron, aluminium and manganese. The leach liquor assayed 230–235 g/l $MgCl_2$, 90–95 g/l $CaCl_2$, 45–50 g/l NaCl and 1–3 g/l Mn, Fe, Al and K.

In the fourth step, the slurry was neutralized to pH 6 with the addition of MgO slurry (376 g of 30% MgO slurry was added over 15 minutes (batch operation)) prior to sparging sulphur dioxide at 1.82 l/min to precipitate calcium as calcium sulphite. The acid liberated by the precipitation of calcium sulphite was neutralized with MgO slurry (604 g of 30% MgO slurry) to maintain pH 6. After 60 minutes of sparging, 99% calcium precipitation was achieved with 178 mg/l Ca remaining in solution. Overall MgO and sulphur dioxide efficiencies were estimated at >64% and >80% respectively at the laboratory scale. One should note that subsequent tests indicated that calcium could be precipitated to below 100 mg/L.

In the fifth step, the final slurry was then filtered at 100° C. to recover the magnesium chloride solution for further purification and the residue was washed for disposal. The final liquor assayed 290–295 g/l $MgCl_2$, 45–50 g/l NaCl, 0.5 g/l $CaCl_2$, 0.6–0 g/l Mn and K and 0.2–2 mg/l Al and Fe. It also contained about 4.25 g/l residual dissolved sulphur dioxide as sulphite. The final residue assayed 5–10% Mg (mainly as inert material), 15–18% Ca (mainly as calcium sulphite) and traces of other elements.

The apparatus for carrying out the above may be any of those disclosed in the U.S. patents incorporated herein by reference, or the apparatus depicted in FIG. 2. Persons of ordinary skill in this art will readily apprehend the reactors, mixers, etc. needed to perform the described process.

The individual components shown in the Drawings are all well-known in the mining arts, and their specific construction an operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for recovering a concentrated magnesium chloride solution from a magnesium-containing material, comprising the steps of:

dissolving, in a water slurry, a magnesium-containing material comprising magnesium, calcium, NaCl, $SO_2$, and solids;

performing a first step for acidifying the water slurry to between substantially pH 4 and substantially pH 6;

performing a second step for acidifying the water slurry to between substantially pH 1 and substantially pH 0, thereby providing a magnesium chloride solution;

precipitating calcium from the magnesium chloride solution;

separating solids from the magnesium chloride solution;

stripping $SO_2$ from the magnesium chloride solution; and precipitating NaCl from the magnesium chloride solution, thereby providing a concentrated magnesium chloride solution.

2. A method according to claim 1, wherein the step of precipitating calcium from the magnesium chloride solution includes the step of precipitating calcium from the magnesium chloride solution as at least one of calcium sulphite or calcium oxalate.

3. A method according to claim 1, wherein the magnesium-containing material is selected from the group consisting of a sludge and a cell house bleed electrolyte.

4. A method according to claim 3, wherein the sludge is selected from the group consisting of a foundry furnace sludge, and an alloying furnace sludge.

5. A method according to claim 1, wherein the magnesium-containing material is selected from one or more of the materials of the group consisting of a magnesium chloride brine and brackish water.

6. A method according to claim 1, further comprising the step of, before said dissolving step, reducing the size of the magnesium-containing material to a range between substantially −10 and substantially −48 mesh.

7. A method according to claim 1, wherein said dissolving step comprises the step of adding the magnesium-containing material to the water slurry at a rate to control the reaction of residual Mg metal with water.

8. A method according to claim 7, wherein the addition of the magnesium-containing material is controlled according to oxidation-reduction potential of the slurry.

9. A method according to claim 1, wherein said dissolving step is carried out at a range from substantially 25° C. to substantially 105° C.

10. A method according to claim 1, wherein the step of acidifying the water slurry to between substantially pH 4 and substantially pH 6 includes the step of adding concentrated hydrochloric acid.

11. A method according to claim 10, wherein hydrochloric acid is added until oxide metals are partially dissolved.

12. A method according to claim 1, wherein the step of acidifying the water slurry to between substantially pH 4 and substantially pH 6 is carried out by adding acid to ensure that a slurry potential will not drop below substantially −1000 mV.

13. A method according to claim 1, wherein said step of acidifying the water slurry to between substantially pH 4 and substantially pH 6 is carried out between substantially 50° C. and substantially 105° C.

14. A method according to claim 1, wherein said step of acidifying the water slurry to between substantially pH 1 and substantially pH 0 comprises the step of adding concentrated hydrochloric acid to the water slurry.

15. A method according to claim 13, wherein a concentrated hydrochloric acid is added to the water slurry until the oxidation-reduction potential becomes positive.

16. A method according to claim 14, wherein the oxidation-reduction potential increases while the pH drops from (i) substantially pH 4 to substantially pH 6 to (ii) substantially pH 0 to substantially pH 1.

17. A method according to claim 1, wherein said second step of acidifying the water slurry to between substantially pH 1 and substantially pH 0 is carried out at a temperature between substantially 50° C. and substantially 105° C.

18. A method according to claim 1, wherein said step of precipitating calcium from the magnesium chloride solution includes the step of neutralizing the magnesium chloride solution to a pH of substantially pH 5 to substantially pH 6.

19. A method according to claim 17, wherein the magnesium chloride-solution obtained by said second acidifying step is neutralized by the addition of a magnesium oxide slurry.

20. A method according to claim 19, wherein, after the addition of the magnesium oxide slurry, the magnesium chloride solution is reacted with a reagent supplying sulphite to precipitate calcium as calcium sulphite.

21. A method according to claim 19, wherein, after the addition of the magnesium oxide slurry, the magnesium chloride solution is reacted with oxalic acid to produce insoluble calcium oxalate.

22. A method according to claim 19, wherein, after the addition of the magnesium oxide slurry, the magnesium chloride solution is sparged with $SO_2$ gas so that, while sparging, acid liberated by precipitation of calcium sulphite is neutralized with the magnesium oxide slurry to maintain the magnesium chloride solution at a pH of substantially pH 5 to substantially pH 6.

23. A method according to claim 1, wherein said step of precipitating calcium is carried out a temperature between substantially 50° C. and substantially 105° C.

24. A method according to claim 1, wherein said separating step separates solid residue containing calcium.

25. A method according to claim 1, wherein, after the separating step, the magnesium chloride solution contains $MgCl_2$, NaCl, and sulphite ions.

26. A method according to claim 1, wherein the stripping step comprises the step of stripping $SO_2$ from the magnesium chloride solution by adjusting the solution pH to substantially pH 0 to substantially pH 3.

27. A method according to claim 26, wherein the pH is adjusted by the addition of hydrochloric acid.

28. A method according to claim 27, wherein the step of stripping $SO_2$ from the magnesium chloride solution includes the step of sparging the magnesium chloride solution with air at a ratio of 0.25 to substantially 1.5 liters of air per liter of magnesium chloride solution.

29. A method according to claim 28, wherein the air-$SO_2$ mixture is treated in a scrubber to produce a sulphite solution.

30. A method according to claim 28, wherein the air-$SO_2$ mixture is re-used in the process as $SO_2$ gas.

31. A method according to claim 1, wherein the stripping step is carried out at a temperature between substantially 50° C. and substantially 105° C.

32. A method according to claim 1, wherein the stripping step comprises the step of stripping $SO_2$ from the magnesium chloride solution until the residual $SO_2$ drops to less than 10 mg/l.

33. A method according to claim 1, further comprising the step of, after said stripping step, prills dissolution in the magnesium chloride solution to precipitate the NaCl.

34. A method according to claim 1, further comprising the step of, after said stripping step, sparging HCl gas to precipitate the NaCl.

35. A method according to claim 1, further comprising the step of separating the precipitated NaCl from the concentrated magnesium chloride solution.

36. A method for recovering a concentrated magnesium chloride solution from a sludge comprising magnesium, calcium, NaCl, $SO_2$, and solids, comprising the steps of:

reducing the size of the sludge to between substantially −10 to −48 mesh;

slurrying the reduced sludge in water to dissolve soluble chloride compounds in the sludge;

acidifying the sludge slurry to between substantially pH 4 and substantially pH 6 by the addition of HCl acid, keeping the slurry potential above, substantially −1000 mV;

further acidifying the sludge slurry to between substantially pH 1 and substantially pH 0 by the addition of HCl acid until the slurry potential reaches a positive value, thereby providing a leach slurry;

neutralizing the leach slurry to pH 5–6 by the addition of MgO;

sparging the neutralized leach slurry;

separating solids from the leach slurry to recover a magnesium chloride solution;

stripping $SO_2$ from the magnesium chloride solution by adding HCl to adjust the pH to pH 0–3, and sparging with air;

increasing the total chloride concentration of the magnesium chloride solution by one of (i) prills dissolution and (ii) HCl sparging, to precipitate NaCl; and separating the precipitated NaCl from the magnesium chloride solution, thereby providing a concentrated magnesium chloride solution.

37. A method according to claim 36, wherein the step of sparging the neutralized leach slurry comprises sparging the neutralized leach slurry with sulphur dioxide gas to precipitate calcium as calcium sulphite.

38. A method according to claim 36, wherein the step of sparging the neutralized leach slurry comprises reacting the neutralized leach slurry with oxalic acid to produce insoluble calcium oxalate.

39. A method for producing a concentrated magnesium chloride solution from a magnesium chloride solution comprising magnesium, calcium, NaCl, $SO_2$, and solids, comprising the steps of:

precipitating calcium from-the magnesium chloride solution;

separating solids from the magnesium chloride solution;

stripping $SO_2$ from the magnesium chloride solution; and precipitating NaCl from the magnesium chloride solution, thereby providing a concentrated magnesium chloride solution.

* * * * *